United States Patent [19]

Bryant

[11] Patent Number: 5,401,906

[45] Date of Patent: Mar. 28, 1995

[54] WATER RESISTANT SUPPLEMENTARY JOINT COVER FOR AN ELECTRICAL BUSWAY

[75] Inventor: Aubrey Bryant, Liberty, Ind.

[73] Assignee: Square D Company, Palatine, Ill.

[21] Appl. No.: 61,974

[22] Filed: May 17, 1993

[51] Int. Cl.⁶ .......................... H01R 4/60; H02G 5/06
[52] U.S. Cl. ................... 174/88 B; 174/68.2; 174/68.3; 174/70 B; 439/210; 439/213
[58] Field of Search ................ 174/68.2, 70 B, 71 B, 174/72 B, 88 B, 99 B, 133 B; 361/775; 439/115, 116, 119, 207, 210, 212, 213, 214

[56] References Cited

U.S. PATENT DOCUMENTS

| | | | |
|---|---|---|---|
| 3,365,537 | 1/1968 | Fehr, Jr. et al. | 174/88 B |
| 3,647,937 | 3/1972 | Jorgensen | 174/88 B |
| 3,852,515 | 12/1974 | Jorgensen et al. | 174/68.2 |
| 4,979,906 | 12/1990 | Shrout et al. | 439/213 |

Primary Examiner—Leo P. Picard
Assistant Examiner—Hyung S. Sough
Attorney, Agent, or Firm—Larry I. Golden; David R. Stacey

[57] ABSTRACT

This present invention provides an inexpensive and easily installed supplementary joint cover system for preventing dripping or splashing water from entering the joint between two adjacent sections of electrical busway. Each busway section includes a housing having an enclosure for surrounding and protecting a plurality of electrical conductors. A pair of housing sides are attached to and spaced apart by the enclosure such that two generally U-shaped troughs are formed. The joint cover system includes four dam assemblies, four sealing strips, two cover plates, two inspection hole plugs, and two connecting channels. Each of the two adjacent busway sections requires two dam assemblies to seal the busway housing at the joint. The dam assemblies form a water resistant block in the troughs formed by the busway housing. The sealing strips are placed across the dam assemblies and provide a seal for the cover plates. The connecting channels have a cross-sectional shape which cooperates with the busway housing sides such that the connecting channel nests with the busway housing side. A water resistant gasket is attached to a nesting side of the connecting channel. As the connecting channel is tightened against the two adjoining busway housing sides it compresses the water resistant gasket sealing the two adjoining busway housing sides and the two cover plates against the ingress of water.

4 Claims, 4 Drawing Sheets

WATER RESISTANT SUPPLEMENTARY JOINT COVER FOR AN ELECTRICAL BUSWAY

FIELD OF THE INVENTION

This invention relates to a busway type electrical distribution system designed for use in areas where it may be exposed to dripping or splashing water and more specifically to an improved method of enclosing the joint between two adjoining sections of busway from the ingress of water.

BACKGROUND OF THE INVENTION

Electrical busway distribution systems have long been employed in buildings where occasional exposure to dripping water from a leaky roof or water sprayed from a nearby broken pipe or a fire sprinkler system may occur. Busways designed for indoor use are intended for installation in dry locations and therefore do not have a completely sealed enclosure. However, indoor busway enclosures will generally provide adequate protection against occasional exposure to water dripping or spraying except at the joint between two adjacent busway sections where the enclosure does not continuously enclose the bus bars and is therefore susceptible to the ingress of water. In order to protect an indoor busway installation from these occasional exposures to dripping or sprayed water, a continuous drip hood may be installed immediately above the busway to prevent dripping water from falling on the busway enclosure and then running into the joint. Supplementary joint covers have also been used to cover the joint areas of indoor busway. These supplementary covers require that water dams be factory installed at the ends of the busway enclosure to prevent water from entering the joint area. The factory installation process requires that the dams be physical attached to the ends of the enclosure and then caulked with a water resistant sealant to prevent the passage of water between the dam and the enclosure. These dams are susceptible to shipping damage or damage during installation of the busway which could cause the water resistant sealant to separate from the enclosure or dam and thereby allow water to pass into the joint area. In some cases, expensive specially designed outdoor busway systems may be installed. The outdoor busway enclosures and joint covers are designed to prevent the ingress of water when exposed to heavy downpours and rain blown by high winds. In any case the installation is more expensive due to increased material and labor costs.

The most desirable solution is to provide an inexpensive and easily installable system of supplementary water dams and joint covers which may be added to sections of previously assembled or previously installed less expensive indoor busway systems. The supplementary dams and covers providing a water resistant seal which protects the entire busway joint area from the ingress of occasional dripping or sprayed water.

SUMMARY OF THE INVENTION

This present invention provides an inexpensive and easily installed supplementary water resistant joint cover system for preventing dripping or splashing water from entering the joint between two adjoining sections of electrical busway. Each of the adjoining busway sections includes a plurality of electrical conductors and a busway housing which has an enclosure for surrounding and protecting the electrical conductors and a pair of steel housing sides which have channel-like flanges along their linear edges for providing additional strength and rigidity to the busway housing. The housing sides are attached to the enclosure such that they are spaced apart by the enclosure and form two generally U-shaped troughs, one trough on each side of the enclosure.

The supplementary joint cover system of the present invention includes four dam assemblies, four sealing strips, two cover plates, two access hole plugs, and two connecting channels. Each dam assembly includes an inside plate, an outside plate, and a sealing plate. The sealing plate is made from a tacky, deformable, substantially nonelastic material, such as, for example, partially cured butyl rubber, and is sandwiched between the inside and outside plates. A dam assembly screw holds the dam assembly together by connecting the inside and outside plates. The outside plate has a flange which is generally perpendicular to the outside plate and extends over the sealing plate and inside plate. The sealing strips are made from the same material as the sealing plates.

Each dam assembly is snugly and slidably received within one of the U-shaped troughs of the busway housing such that the flange of the outside plate and the channel-like flanges of the housing sides form a flat surface running the full width of the busway housing. Two dam assemblies are required to seal one end of each busway section. Accordingly, the two adjoining busway section ends enclosed by the water resistant joint cover each require two dam assemblies to seal the joint. Each dam assembly is positioned at a predetermined distance from the end of its associated busway housing sides. The dam assembly is sealed to the busway housing by tightening the dam assembly screw causing the deformable sealing plate to be squeezed out from between the inside and outside plates and thereby sealing the dam assembly to the busway housing.

The sealing strips are placed across the flat surface provided by the flanges of the outside plates and the channel-like flanges of the two spaced apart housing sides such that said sealing strips extend completely across the busway housing. A cover plate is positioned over the joint area such that each end covers one of the sealing strips and dam assemblies of the two adjoined busway sections. The cover plate is attached to the flanges of the dam assemblies by screws. As the cover plate is tightened down against the flange the sealing strip compresses and is squeezed into any cracks between the housing sides, the dam assembly flange and the cover plate thereby forming a water resistant seal. Each cover plate is provided with an inspection hole for permitting the joint connection to be checked without removing the cover plate. An inspection hole plug is provided to seal the inspection hole.

The connecting channels connect the busway housing sides of the two adjoining busway sections and provide protection for the electrical joint. Each connecting channel is generally rectangular and has a cross-sectional shape generally compatible with the cross-sectional shape of the busway housing sides such that the connecting channel will nest against the housing side. The connecting channel has a water resistant gasket attached to its nesting side. As the connecting channel is tightened against the two adjoining busway housing sides it compresses the gasket sealing the two adjoining busway housing sides and the two cover plates against the ingress of water.

Figure 1:
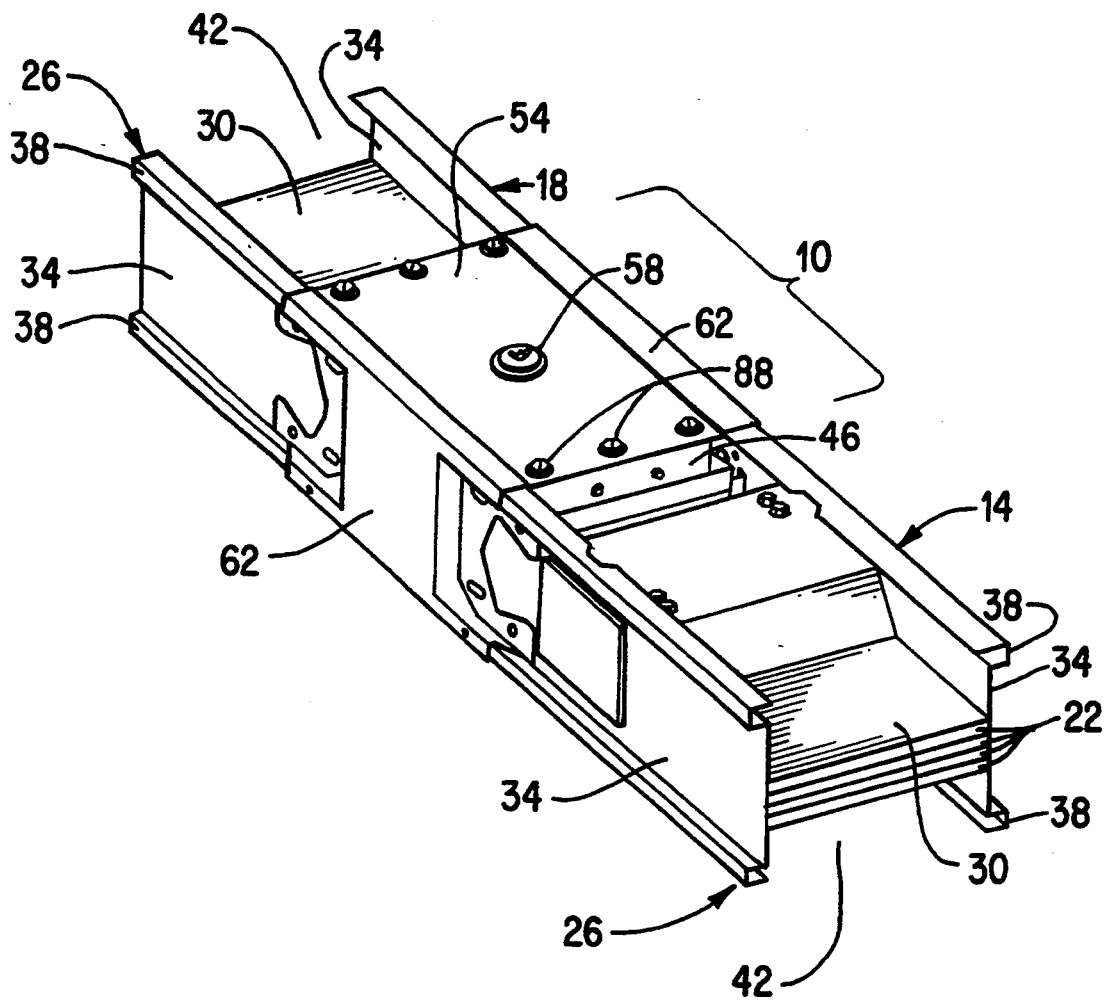
FIG. 1 is a perspective view showing an assembled water resistant joint cover which embodies various features of the invention installed over the electrical joint between two adjoining sections of prior art electrical busway.
Figure 2:
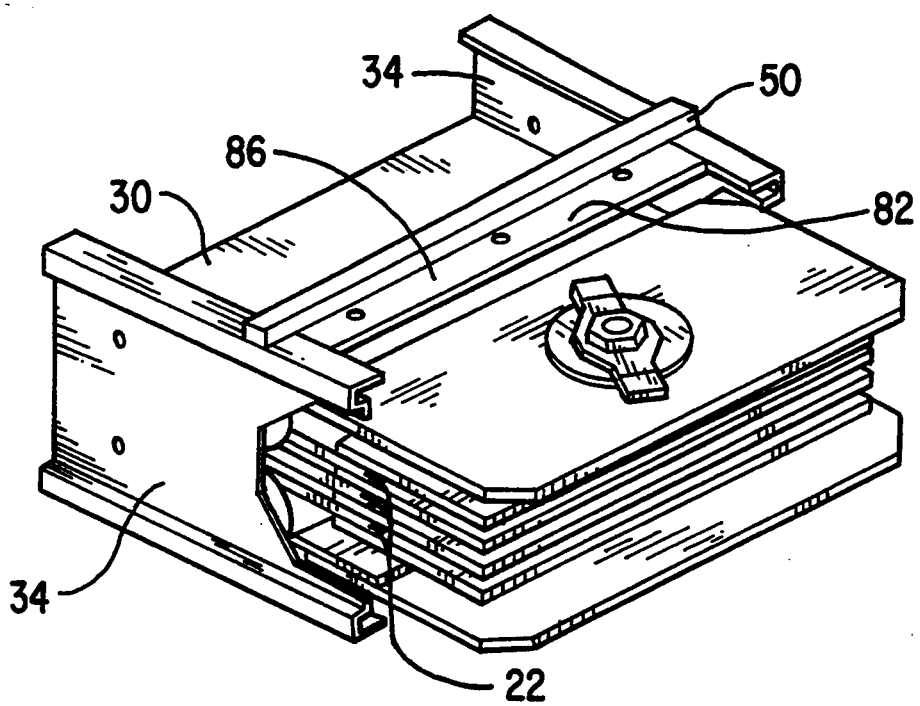
FIG. 2 is a perspective view of a busway joint area showing one dam assembly and one sealing strip of the present invention installed.
Figure 3:
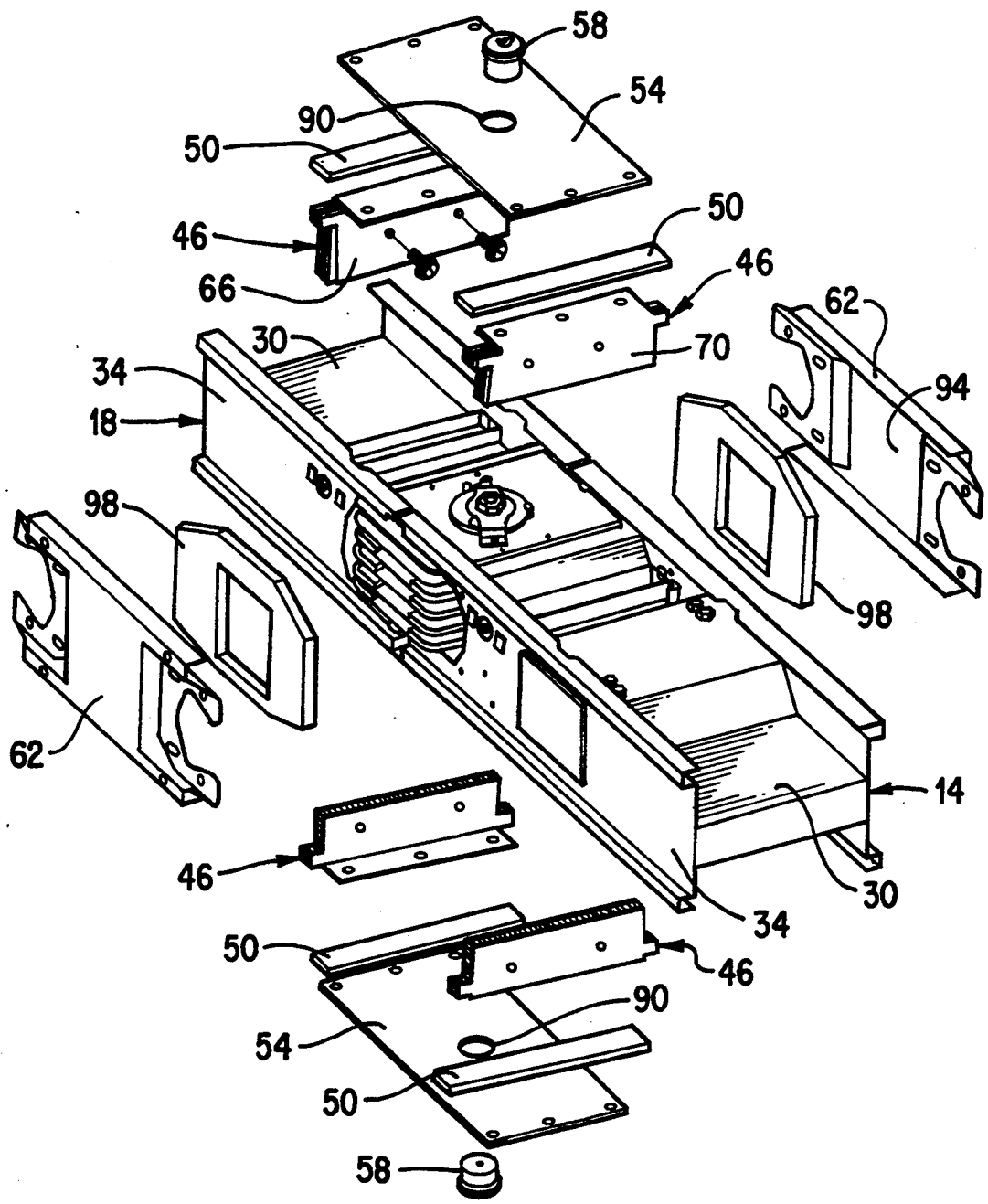
FIG. 3 is an exploded view of the water resistant joint cover of the present invention with the joined first and second busway sections.
Figure 4:
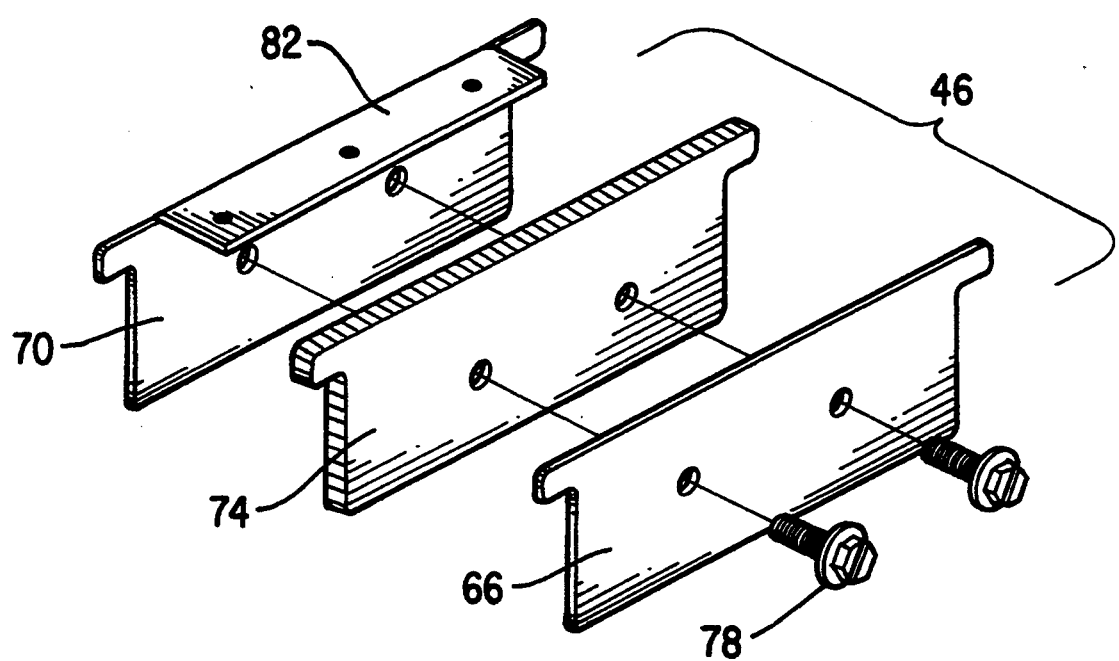
FIG. 4 is an exploded view of the dam assembly.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various other ways. Also, it is to be understood that the phraseology and terminology used herein is for the purpose of description and should not be regarded as limiting.

DESCRIPTION OF THE PREFERRED EMBODIMENT

FIG. 1 illustrates a water resistant joint cover system generally indicated by reference numeral 10 installed over the joint between a first electrical busway section 14 and a second adjoining electrical busway section 18. Each of the adjoining busway sections 14 and 18 includes a plurality of electrical conductors 22 and a busway housing generally indicated by reference numeral 26. The busway housing 26 includes an enclosure 30 for surrounding and protecting the electrical conductors 22 and a pair of steel housing sides 34 which have channel-like flanges 38 along there linear edges for providing additional strength and rigidity to the busway housing. The housing sides 34 are attached to the enclosure 30 such that they are spaced apart by the enclosure 30 and form two generally U-shaped troughs 42, one trough 42 being on each side of the enclosure 30.

The supplementary joint cover system 10 includes four dam assemblies 46, four sealing strips 50, two cover plates 54, two inspection hole plugs 58, and two connecting channels 62. Each dam assembly 46 includes an inside plate 66, an outside plate 70, and a sealing plate 74. The sealing plate 74 is made from a tacky, deformable, substantially nonelastic material, which is, in the preferred embodiment, a partially cured butyl rubber, and is sandwiched between the inside and outside plates 66 and 70 respectively. A dam assembly screw 78 holds the dam assembly 46 together by connecting the inside and outside plates 66 and 70 respective. The outside plate 70 has a flange 82 which is generally perpendicular to the outside plate 70 and extends over the sealing plate 74 and inside plate 66. The sealing strips 50 are made from the same material as the sealing plates 74.

Each dam assembly 46 is snugly and slidably received within one of the U-shaped troughs 42 of the busway housing 26 such that the flange 82 of the outside plate 70 and the channel-like flanges 38 of the housing sides 34 forms a flat surface 86 running the full width of the busway housing 26. Two dam assemblies 46 are required to sealed one end of each busway section. Accordingly, the two adjoining busway section ends enclosed by the water resistant joint cover system 10 each require two dam assemblies 46 to seal the joint. Each dam assembly 46 is positioned at a predetermined distance from the end of its associated busway housing sides 34. The dam assembly 46 is sealed to the busway housing 26 by tightening the dam assembly screw 78 which causes the deformable sealing plate 74 to be squeezed out from between the inside and outside plates 66 and 70 respectively, thereby sealing the dam assembly 46 to the busway housing 26.

The sealing strips 50 are placed across the flat surface 86 provided by the flanges 82 of the outside plates 70 and the channel-like flanges 38 of the two spaced apart housing sides 34 such that the sealing strips 50 extend completely across the width of the busway housing 26. A cover plate 54 is placed over the joint area such that each end covers one of the sealing strips 50 and dam assemblies 46 of the two adjoined busway sections 14 and 18. The cover plate 54 is attached to the flanges 82 of the dam assemblies 46 by screws 88. As the cover plate 54 is tightened down against the flange 82, the sealing strip 50 is compressed and is squeezed into any cracks between the housing sides 34, the dam assembly flange 82 and the cover plate 54 thereby forming a water resistant seal. Each cover plate 54 is provided with an inspection hole 90 for permitting the joint connection to be checked without removing the cover plate 54. The inspection hole plug 58 provides a seal for the inspection hole 90.

The connecting channels 62 connect the busway housing sides 34 of the two adjoining busway sections 14 and 18 and provide protection for the electrical joint. Each connecting channel 62 is generally rectangular and has a cross-sectional shape generally compatible with the cross-sectional shape of the busway housing sides such that the connecting channel has a nesting side 94 which will nest against the housing side 34. The connecting channel 62 has a water resistant gasket 98 attached to its nesting 94 side. As the connecting channel 62 is tightened against the two adjoining busway housing sides 34, it compresses the gasket 98 sealing the two adjoining busway housing sides 34 and the two cover plates 54 against the ingress of water.

Various features of the invention are set forth in the following claims.

I claim:

1. A water resistant joint cover for enclosing the electrical joint connection between a first electrical busway section and a second adjoining electrical busway section, each busway section includes a plurality of electrical conductors, a busway housing having an enclosure for surrounding and protecting the electrical conductors and a pair of housing sides attached to and spaced apart by the enclosure such that two generally U-shaped troughs are formed, one trough being on each side of the enclosure, each housing side includes a channel-like flange along its linear edges to provide additional strength and support, said water resistant joint cover comprising:

portions of the first and second busway housings immediately adjacent the electrical joint connection and extending outwardly a predetermined distance from the electrical joint connection, each of said housing portions including the enclosure, housing sides and U-shaped troughs;

a plurality of dam assemblies each being generally rectangular in shape and having an inside plate, an outside plate and a sealing plate sandwiched between said outside and inside plates, said plates being held together by at least one dam assembly screw, said outside plate including a flange which is generally perpendicular to said outside plate and extends over said sealing plate and said inside plate, each said dam assembly is snugly but slidably received within one of the U-shaped troughs of said housing portions such that said flange of said outside plate forms a generally flat surface with the channel-like flanges of the housing sides of said housing portions, said dam assembly thereby blocking the U-shaped trough of said housing portions at a predetermined distance from the end of its associated housing side;

a plurality of sealing strips made from a tacky, deformable, substantially nonelastic material, one sealing strip being placed across each said flange of said outside plate such that said sealing strip extends across the channel-like flanges of the two spaced apart housing sides of said housing portions;

a plurality of cover plates, each being generally rectangular in shape and having an inspection hole in about the center thereof for permitting the joint connection to be checked without removing the cover plate, said cover plates being attached to said flanges of said dam assemblies such that said sealing strips are compressed and squeezed into all cracks between said housing portions, said dam assembly flanges, and said cover plate, thereby forming a water resistant seal;

a pair of inspection hole plugs for sealing said inspection holes in said cover plates; and a pair of generally rectangular connecting channels having a cross-sectional shape for cooperating with the cross-sectional shape of the busway housing sides of said housing portions such that said connecting channel has a nesting side which will nest with the housing sides of said housing portions, each said connecting channel including a water resistant gasket attached to said nesting side, said connecting channel being attached to the ends of the housing sides of said housing portions of the two adjoined busway sections such that the joint is covered and said water resistant gasket is compressed against the two adjacent housing sides of said housing portions and the two cover plates, thereby forming a water resistant seal.

2. The water resistant joint cover of claim 1 wherein said sealing plate is made from a tacky, deformable, substantially nonelastic material which, when said dam assembly screw is tightened, will be squeezed out from between said inside and outside plates, thereby filling any cracks between said dam assembly and the busway housing sides and enclosure of said housing portions to form a water resistant seal.

3. A water resistant joint cover for enclosing an electrical joint connection between a first electrical busway section and a second adjoining electrical busway section, each busway section including a plurality of electrical conductors and a busway housing for surrounding and protecting the electrical conductors, said water resistant joint cover comprising:

housing portions of the first and second busway housings immediately adjacent the electrical joint connection, each extending a predetermined distance outwardly from the electrical joint connection;

a plurality of dam assemblies, each being generally rectangular in shape and having a generally perpendicular flange along one edge, a pair of said dam assemblies being positioned to engage each of said housing portions on opposite sides of each of the first and second busway sections at predetermined locations and being positioned such that said flanges are distal from said housing portions, said flanges of said dam assemblies of the first busway section facing said flanges of said dam assemblies of the second busway section;

a pair of cover plates, each being generally rectangular in shape and being positioned such that said cover plates are spaced apart one from the other in generally parallel planes, said cover plates positioned such that their ends are in alignment with said flanges of said dam assemblies;

a plurality of cover sealing strips, one sealing strip being placed on each said flange of each said dam assembly such that said sealing strips lie between said flanges;

means for attaching said cover plates to said flanges such that said sealing strips are squeezed into any cracks between said housing portions, said flanges, and said cover plates;

a pair of connecting channels, each being generally rectangular and having a cross-sectional shape for cooperating with the cross-sectional shape of said housing portions such that said connecting channels include a nesting side which will nest with said housing portions, said connecting channels being positioned to engage said housing portions and said cover plates;

a pair of water resistant gaskets, each being attached to said nesting side of one of said connecting channels such that it may be compressed against said housing portion and said cover plates to form a water resistant seal; and means for attaching said connecting channels to said housing portions.

4. The water resistant joint cover of claim 3 wherein each said dam assembly further comprises:

an outside plate being generally flat and rectangular in shape and including said flange;

a sealing plate being generally flat and rectangular in shape and made from a tacky, deformable, substantially nonelastic material;

an inside plate being generally flat and rectangular in shape; and means for connecting said outside plate, said sealing plate and said inside plate such that a force may be exerted between said outside and inside plates thereby causing said sealing plate to be squeezed out from between said outside and inside plates to fill any cracks between said dam assembly and said housing portions.

* * * * *